United States Patent
Shveidel

(10) Patent No.: US 10,083,067 B1
(45) Date of Patent: Sep. 25, 2018

(54) THREAD MANAGEMENT IN A STORAGE SYSTEM

(71) Applicant: EMC Corporation, Hopkinton, MA (US)

(72) Inventor: Vladimir Shveidel, Pardes-Hana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 97 days.

(21) Appl. No.: 15/196,472

(22) Filed: Jun. 29, 2016

(51) Int. Cl.
  G06F 9/46 (2006.01)
  G06F 9/52 (2006.01)

(52) U.S. Cl.
  CPC ........................ *G06F 9/52* (2013.01)

(58) Field of Classification Search
  CPC ........................................................ G06F 9/52
  See application file for complete search history.

(56) References Cited

U.S. PATENT DOCUMENTS

| | | |
|---|---|---|
| 4,164,763 A | 8/1979 | Briccetti et al. |
| 4,608,839 A | 9/1986 | Tibbals, Jr. |
| 4,821,178 A | 4/1989 | Levin et al. |
| 5,319,645 A | 6/1994 | Bassi et al. |
| 5,537,534 A | 7/1996 | Voigt et al. |
| 5,539,907 A | 7/1996 | Srivastava et al. |
| 5,627,995 A | 5/1997 | Miller et al. |
| 5,710,724 A | 1/1998 | Burrows |
| 5,732,273 A | 3/1998 | Srivastava et al. |
| 5,860,137 A | 1/1999 | Raz et al. |
| 5,896,538 A | 4/1999 | Blandy et al. |
| 5,903,730 A | 5/1999 | Asai et al. |
| 5,940,618 A | 8/1999 | Blandy et al. |
| 5,987,250 A | 11/1999 | Subrahmanyam |
| 5,999,842 A | 12/1999 | Harrison et al. |
| 6,226,787 B1 | 5/2001 | Serra et al. |
| 6,327,699 B1 | 12/2001 | Larus et al. |

(Continued)

FOREIGN PATENT DOCUMENTS

| | | |
|---|---|---|
| EP | 1804157 | 7/2007 |
| WO | WO 2010/019596 | 2/2010 |

(Continued)

OTHER PUBLICATIONS

U.S. Non-Final Office Action dated Dec. 11, 2017 for U.S. Appl. No. 15/196,447; 54 Pages.

(Continued)

*Primary Examiner* — Camquy Truong
(74) *Attorney, Agent, or Firm* — Daly, Crowley Mofford & Durkee, LLP

(57) ABSTRACT

Described embodiments provide systems and methods for operating a storage system. The storage system may generate one or more input/output (I/O) caller threads. For each of the I/O caller threads, one or more background provider threads may be generated that may be associated with the I/O caller thread. Instructions associated with the I/O caller threads and the background provider threads may be performed. Each of the one or more background provider threads may be synchronized with the associated I/O caller thread. Each thread may check a state of the associated threads, and based upon the state of the associated threads, each thread may post a state indicator to a mailbox field in a context of the associated threads.

15 Claims, 10 Drawing Sheets

(56) References Cited

U.S. PATENT DOCUMENTS

| | | |
|---|---|---|
| 6,353,805 B1 | 3/2002 | Zahir et al. |
| 6,470,478 B1 | 10/2002 | Bargh et al. |
| 6,519,766 B1 | 2/2003 | Barritz et al. |
| 6,643,654 B1 | 11/2003 | Patel et al. |
| 6,654,948 B1 | 11/2003 | Konuru et al. |
| 6,658,471 B1 | 12/2003 | Berry et al. |
| 6,658,654 B1 | 12/2003 | Berry et al. |
| 6,870,929 B1 | 3/2005 | Greene |
| 7,099,797 B1 | 8/2006 | Richard |
| 7,143,410 B1* | 11/2006 | Coffman ............ G06F 9/526 718/100 |
| 7,251,663 B1 | 7/2007 | Smith |
| 7,315,795 B2 | 1/2008 | Homma |
| 7,389,497 B1 | 6/2008 | Edmark et al. |
| 7,421,681 B2 | 9/2008 | DeWitt, Jr. et al. |
| 7,552,125 B1 | 6/2009 | Evans |
| 7,574,587 B2 | 8/2009 | DeWitt, Jr. et al. |
| 7,714,747 B2 | 5/2010 | Fallon |
| 7,814,218 B1 | 10/2010 | Knee et al. |
| 7,827,136 B1 | 11/2010 | Wang et al. |
| 7,908,436 B1 | 3/2011 | Srinivasan et al. |
| 8,200,923 B1 | 6/2012 | Healey et al. |
| 8,335,899 B1 | 12/2012 | Meiri et al. |
| 8,413,162 B1* | 4/2013 | Rozas ............ G06F 9/466 718/100 |
| 8,478,951 B1 | 7/2013 | Healey et al. |
| 9,037,822 B1 | 5/2015 | Meiri et al. |
| 9,104,326 B2 | 8/2015 | Frank et al. |
| 9,128,942 B1 | 9/2015 | Pfau et al. |
| 9,208,162 B1 | 12/2015 | Hallak et al. |
| 9,304,889 B1 | 4/2016 | Chen et al. |
| 9,330,048 B1 | 5/2016 | Bhatnagar et al. |
| 9,762,460 B2 | 9/2017 | Pawlowski et al. |
| 9,769,254 B2 | 9/2017 | Gilbert et al. |
| 9,785,468 B2 | 10/2017 | Mitchell et al. |
| 2002/0056031 A1 | 5/2002 | Skiba et al. |
| 2003/0023656 A1 | 1/2003 | Hutchison et al. |
| 2003/0079041 A1 | 4/2003 | Parrella, Sr. et al. |
| 2003/0145251 A1 | 7/2003 | Cantrill |
| 2004/0030721 A1 | 2/2004 | Kruger et al. |
| 2005/0039171 A1 | 2/2005 | Avakian et al. |
| 2005/0102547 A1 | 5/2005 | Keeton et al. |
| 2005/0125626 A1 | 6/2005 | Todd |
| 2005/0144416 A1 | 6/2005 | Lin |
| 2005/0171937 A1 | 8/2005 | Hughes et al. |
| 2005/0177603 A1 | 8/2005 | Shavit |
| 2005/0193084 A1 | 9/2005 | Todd et al. |
| 2006/0031653 A1 | 2/2006 | Todd et al. |
| 2006/0031787 A1 | 2/2006 | Ananth et al. |
| 2006/0047776 A1 | 3/2006 | Chieng et al. |
| 2006/0070076 A1 | 3/2006 | Ma |
| 2006/0123212 A1 | 6/2006 | Yagawa |
| 2006/0242442 A1* | 10/2006 | Armstrong ............ G06F 1/14 713/400 |
| 2007/0078982 A1 | 4/2007 | Aidun et al. |
| 2007/0208788 A1 | 9/2007 | Chakravarty et al. |
| 2007/0297434 A1 | 12/2007 | Arndt et al. |
| 2008/0163215 A1* | 7/2008 | Jiang ............ G06F 9/546 718/100 |
| 2008/0178050 A1 | 7/2008 | Kern et al. |
| 2008/0288739 A1 | 11/2008 | Bamba et al. |
| 2009/0006745 A1 | 1/2009 | Cavallo et al. |
| 2009/0030986 A1 | 1/2009 | Bates |
| 2009/0049450 A1 | 2/2009 | Dunshea et al. |
| 2009/0089483 A1 | 4/2009 | Tanaka et al. |
| 2009/0100108 A1 | 4/2009 | Chen et al. |
| 2009/0222596 A1 | 9/2009 | Flynn et al. |
| 2009/0319996 A1 | 12/2009 | Shafi et al. |
| 2010/0042790 A1 | 2/2010 | Mondal et al. |
| 2010/0180145 A1 | 7/2010 | Chu |
| 2010/0199066 A1 | 8/2010 | Artan et al. |
| 2010/0205330 A1 | 8/2010 | Noborikawa et al. |
| 2010/0223619 A1 | 9/2010 | Jaquet et al. |
| 2010/0257149 A1 | 10/2010 | Cognigni et al. |
| 2011/0060722 A1 | 3/2011 | Li et al. |
| 2011/0083026 A1 | 4/2011 | Mikami et al. |
| 2011/0099342 A1 | 4/2011 | Ozdemir |
| 2011/0119679 A1 | 5/2011 | Muppirala et al. |
| 2011/0161297 A1 | 6/2011 | Parab |
| 2011/0225122 A1 | 9/2011 | Denuit et al. |
| 2012/0054472 A1 | 3/2012 | Altman et al. |
| 2012/0059799 A1 | 3/2012 | Oliveira et al. |
| 2012/0078852 A1 | 3/2012 | Haselton et al. |
| 2012/0124282 A1 | 5/2012 | Frank et al. |
| 2012/0278793 A1 | 11/2012 | Jalan et al. |
| 2012/0290546 A1 | 11/2012 | Smith et al. |
| 2012/0290798 A1 | 11/2012 | Huang et al. |
| 2012/0304024 A1 | 11/2012 | Rohleder et al. |
| 2013/0031077 A1 | 1/2013 | Liu et al. |
| 2013/0073527 A1 | 3/2013 | Bromley |
| 2013/0111007 A1 | 5/2013 | Hoffmann et al. |
| 2013/0138607 A1 | 5/2013 | Bashyam et al. |
| 2013/0151683 A1 | 6/2013 | Jain et al. |
| 2013/0151759 A1 | 6/2013 | Shim et al. |
| 2013/0246724 A1 | 9/2013 | Furuya |
| 2013/0265883 A1 | 10/2013 | Henry et al. |
| 2013/0282997 A1 | 10/2013 | Suzuki et al. |
| 2013/0332610 A1 | 12/2013 | Beveridge |
| 2014/0040199 A1 | 2/2014 | Golab et al. |
| 2014/0136759 A1 | 5/2014 | Sprouse et al. |
| 2014/0161348 A1 | 6/2014 | Sutherland et al. |
| 2014/0237201 A1 | 8/2014 | Swift |
| 2014/0297588 A1 | 10/2014 | Babashetty et al. |
| 2014/0359231 A1 | 12/2014 | Matthews |
| 2014/0380282 A1 | 12/2014 | Ravindranath Sivalingam et al. |
| 2015/0006910 A1 | 1/2015 | Shapiro |
| 2015/0088823 A1 | 3/2015 | Chen et al. |
| 2015/0112933 A1 | 4/2015 | Satapathy |
| 2015/0149739 A1 | 5/2015 | Seo et al. |
| 2015/0249615 A1 | 9/2015 | Chen et al. |
| 2015/0324236 A1 | 11/2015 | Gopalan et al. |
| 2016/0042285 A1 | 2/2016 | Gilenson et al. |
| 2016/0080482 A1 | 3/2016 | Gilbert et al. |
| 2016/0188419 A1 | 6/2016 | Dagar et al. |
| 2016/0350391 A1 | 12/2016 | Vijayan et al. |
| 2016/0359968 A1 | 12/2016 | Chitti et al. |
| 2016/0366206 A1 | 12/2016 | Shemer et al. |
| 2017/0123704 A1 | 5/2017 | Sharma et al. |
| 2017/0139786 A1 | 5/2017 | Simon et al. |
| 2017/0161348 A1 | 6/2017 | Araki et al. |

FOREIGN PATENT DOCUMENTS

| | | |
|---|---|---|
| WO | WO 2010/04007 | 4/2010 |
| WO | WO 2012/066528 | 5/2012 |

OTHER PUBLICATIONS

U.S. Non-Final Office Action dated Dec. 14, 2017 for U.S. Appl. No. 15/076,946; 28 Pages.
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/085,168, filed Mar. 30, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
U.S. Appl. No. 15/196,674, filed Jun. 29, 2016, Kleiner, et al.
U.S. Appl. No. 15/196,427, filed Jun. 29, 2016, Shveidel.
U.S. Appl. No. 15/198,374, filed Jun. 29, 2016, Shveidel, et al.
U.S. Appl. No. 15/196,447, filed Jun. 29, 2016, Shveidel, et al.
Search Report and Written Opinion dated Dec. 1, 2011 for PCT Application No. PCT/IL2011/000692; 11 Pages.

(56) References Cited

OTHER PUBLICATIONS

PCT international Preliminary Report dated May 30, 2013 for PCT Patent Application No. PCT/IL2011/000692; 7 Pages.
U.S. Appl. No. 12/945,915.
Nguyen et al., "B+ Hash Tree: Optimizing Query Execution Times for on-Disk Semantic Web Data Structures;" Proceedings of the 6$^{th}$ international Workshop on Scalable Semantic Web Knowledge Base Systems; Shanghai, China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,981; 28 Pages.
Response to Office Action dated Jul. 22, 2015 corresponding to U.S. Appl. No. 14/034,981; Response filed on Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed on Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405;Response filed Oct. 6, 2015; 1 Page.
Office Action dated Dec. 1, 2015 corresponding to U.S. Appl. No. 14/230,405; 17 Pages.
Office Action dated Feb. 4, 2016 oorresponding to U.S. Appl. No. 14/037,577; 26 Pages.
Notice of Aliowance dated Feb. 10, 2016 corresponding to U.S. Appl. No. 14/494,899; 19 Pages.
Notice of Ailowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
Response filed on May 2, 2016 to the Non-Final Office Action dated Dec. 1, 2015; for U.S. Appl. No. 14/230,405; 8 pages.
Response filed on May 2, 2016 to the Non-Final Office Action dated Feb. 4, 2016; for U.S. Appl. No. 14/037,577; 10 pages.
Office Action dated Nov. 1, 2017 corresponding to U.S. Appl. No. 15/196,374, 64 Pages.
U.S. Non-Final Office Action dated Jan. 11, 2018 corresponding to U.S. Appl. No. 15/085,168; 14 Pages.
U.S. Non-Final Office Action dated Dec. 29, 2017 corresponding to U.S. Appl. No. 15/196,674; 34 Pages.

\* cited by examiner

THREAD MANAGEMENT IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect may provide a method for operating a storage system. The storage system may generate input/output (I/O) caller threads. For each of the I/O caller threads, background provider threads may be generated that may be associated with the I/O caller thread. Each of the one or more background provider threads may be synchronized with the associated I/O caller thread. Each background provider thread may be synchronized with the I/O caller thread according to respective states of the I/O caller threads and the one or more background provider threads, the respective states indicated by at least one of associated context data and an associated synchronization object.

Another aspect may provide a system including a processor and a memory storing computer program code that when executed on the processor causes the processor to operate a storage system. The system may be operable to generate one or more input/output (I/O) caller threads to operate a storage system. For each of the I/O caller threads, background provider threads may be generated that may be associated with the I/O caller thread. Each of the one or more background provider threads may be synchronized with the associated I/O caller thread. Each background provider thread may be synchronized with the I/O caller thread according to respective states of the I/O caller threads and the one or more background provider threads, the respective states indicated by at least one of associated context data and an associated synchronization object.

Another aspect may provide a computer program product including a non-transitory computer readable storage medium having computer program code encoded thereon that when executed on a processor of a computer causes the computer to operate a storage system. The computer program product may include computer program code to generate one or more input/output (I/O) caller threads to operate a storage system. For each of the I/O caller threads, background provider threads may be generated that may be associated with the I/O caller thread. Each of the one or more background provider threads may be synchronized with the associated I/O caller thread. Each background provider thread may be synchronized with the I/O caller thread according to respective states of the I/O caller threads and the one or more background provider threads, the respective states indicated by at least one of associated context data and an associated synchronization object.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
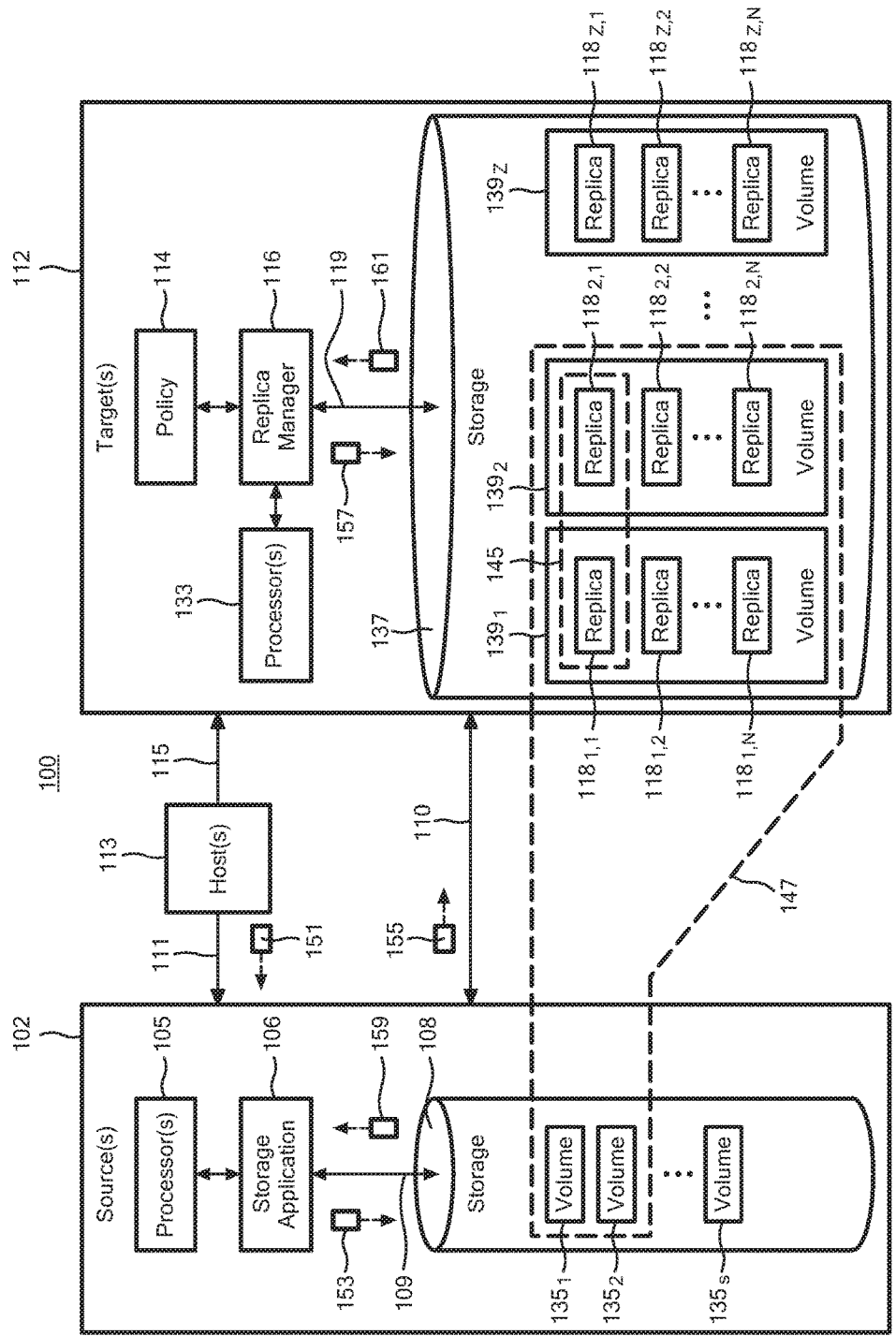
FIG. 1 is a block diagram of an example of a storage system in accordance with an illustrative embodiment.

FIG. 1 shows an example storage system 100 that may perform thread management of storage system 100, in accordance with illustrative embodiments. Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-Z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-Z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
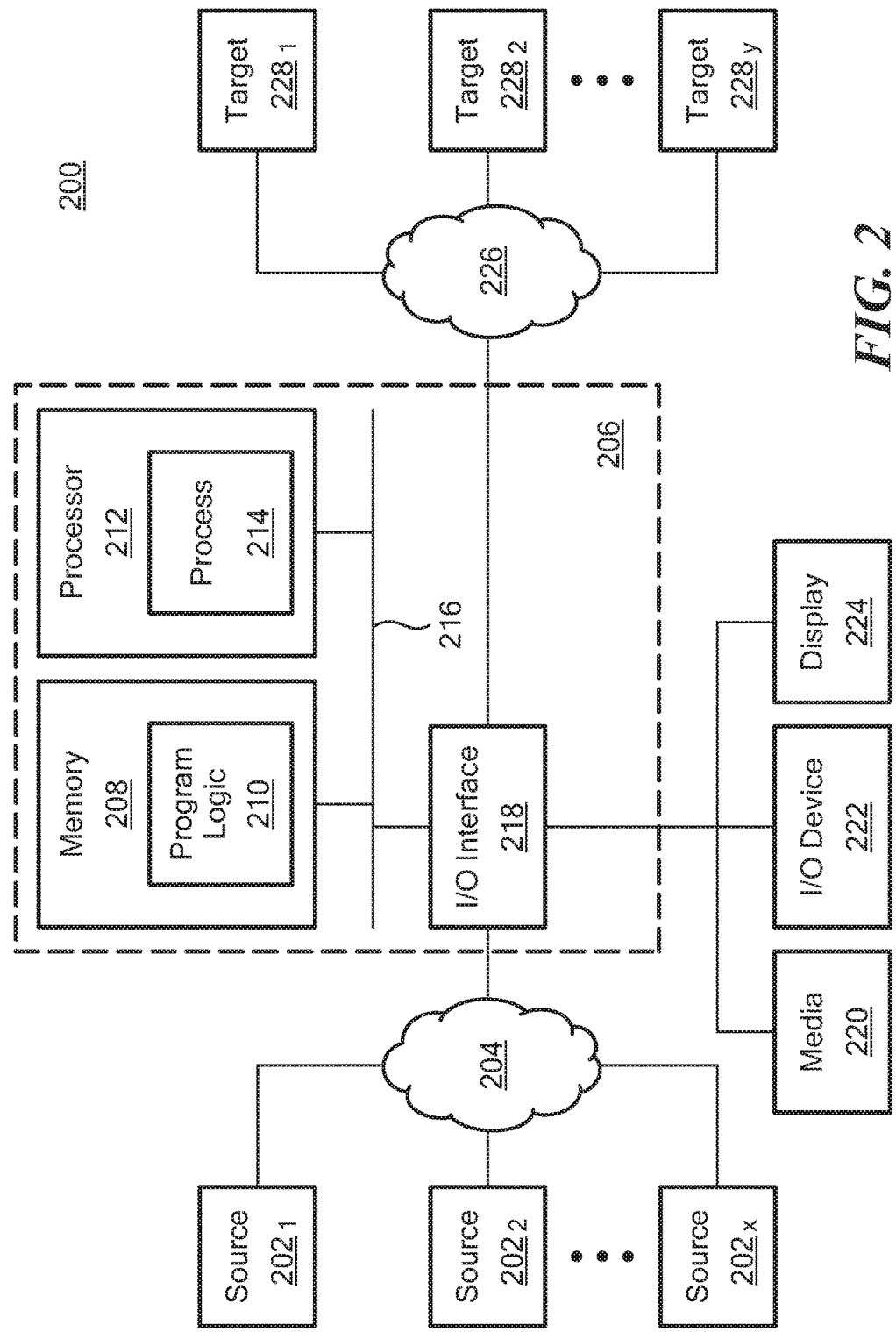
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
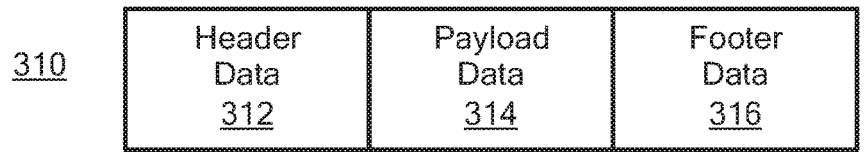
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly to I/O request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Figure 3B:
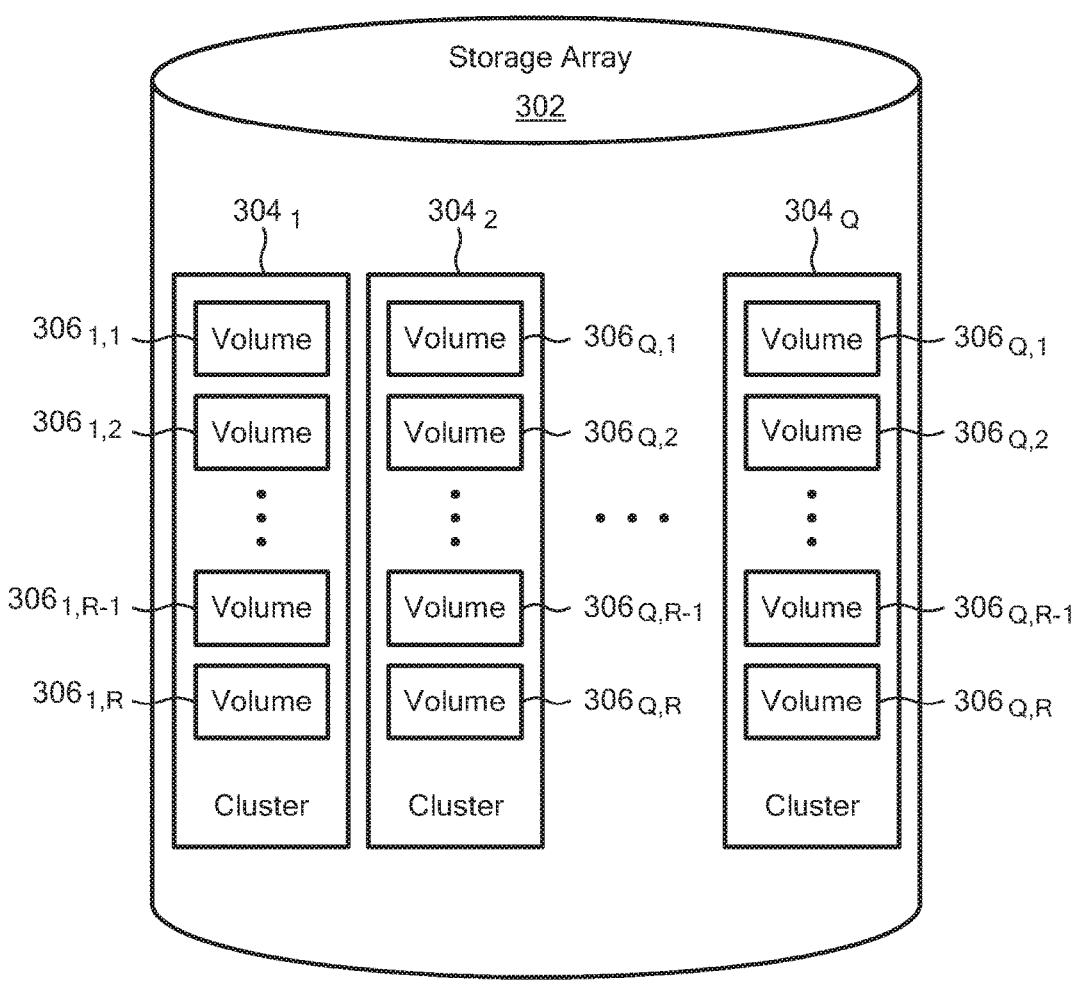
FIG. 3B is a block diagram of an example storage array of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. For example, clusters 304 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Described embodiments may provide for management of threads of storage system 100. For example, storage system 100 may perform one or more threads of instructions or operations in response to receiving an I/O request (e.g., I/O request 151 of FIG. 1). For example, a thread may be a series of instructions performed by processor 105 in response to I/O request 151. In some embodiments, multiple threads may be performed concurrently. As threads are performed, a given thread may complete and expire. Described embodiments detach expired threads without a synchronization object that is external to the thread. For example, an external synchronization object may include an external semaphore, lock, or event that a thread may interact with to communicate with another thread. Some embodiments may allow two or more threads to communicate, and be synchronized, between one another without employing such external synchronization objects.

In some embodiments, an application (e.g., a server application for a given one of storage clusters 304) may have a requirement (e.g., a hard time constraint) to reply to a client (e.g., host(s) 113) within a predefined time limit. Such applications may employ one or more synchronous threads to achieve the time limit. However, in certain operating circumstances, processing may take more time than allowed by a synchronous thread's timeout period. In such a condition, when a synchronous thread times out, described embodiments may return a BUSY message to the client while continuing to perform the synchronous thread as a background operation (e.g., as an asynchronous thread). In such an embodiment, if the client repeats the request associated with the synchronous thread, processing associated with the thread may already be completed as a background operation from the previous request.

For example, described embodiments may restart a given one of storage clusters 304 of FIG. 3B. Upon restart, metadata associated with the cluster may have been demoted from a fast memory (e.g., a cache) into a slower memory (e.g., a disk). Thus, when a cluster is restarted, an I/O request to the cluster may take longer than usual, since the metadata may need to be retrieved from the slower memory instead of the fast memory. Thus, if a synchronous thread associated with the I/O request times out, described embodiments may complete loading the cluster metadata as a background operation. If a client repeats the I/O request to the cluster, the metadata may already be loaded in the memory by the background operation.

Figure 3C:
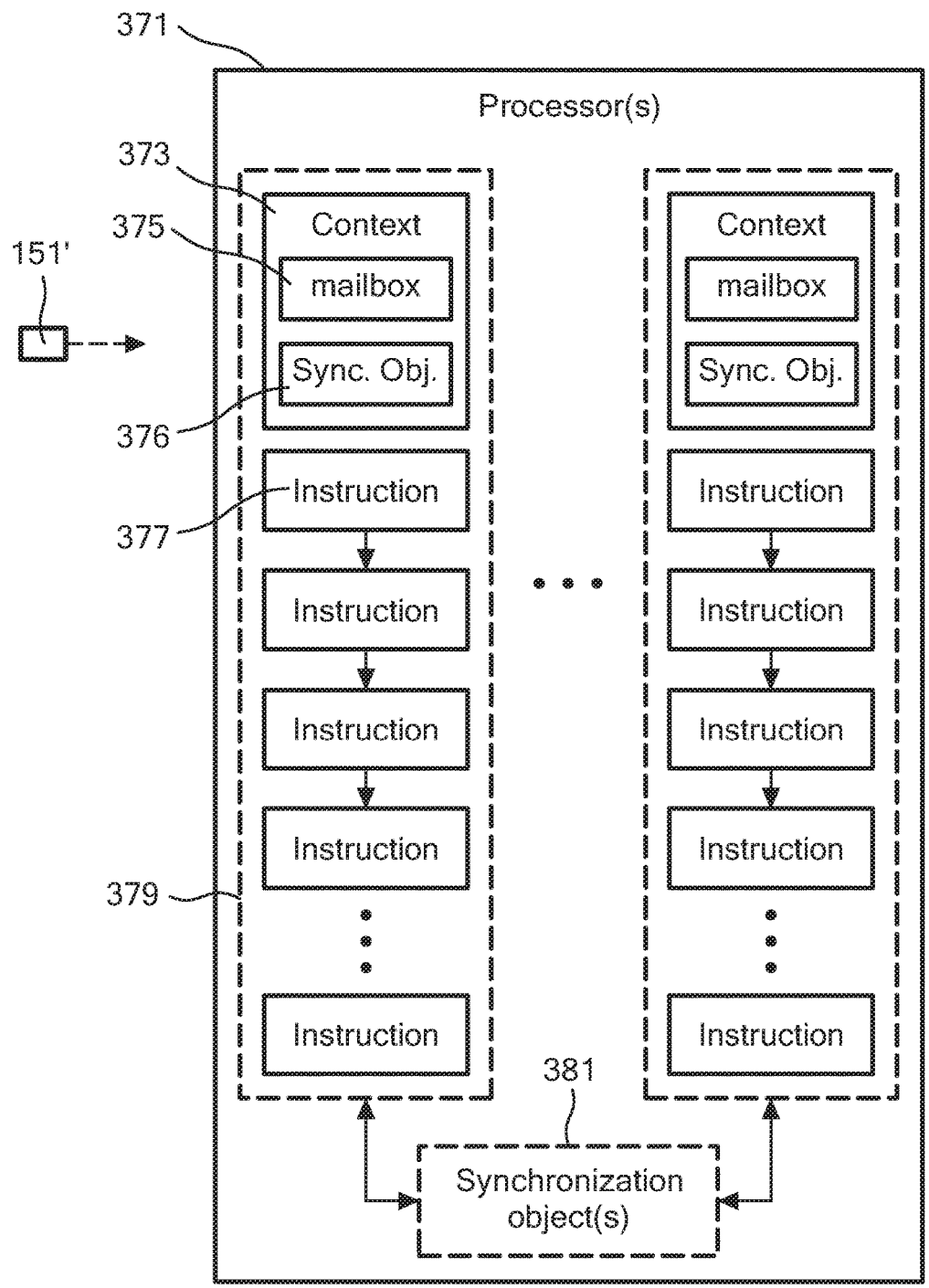
FIG. 3C is a block diagram showing example threads of the storage system of FIG. 1 in accordance with an illustrative embodiment.

Described embodiments may employ one or more threads to perform operations of storage system 100 (e.g., operations associated with I/O request 151). For example, as shown in FIG. 3C, processors 371 (e.g., one or more or processors 105 and/or processors 133) may employ one or more threads 379. Each thread 379 may be a thread of one or more instructions 377 that are performed by storage system 100. Each thread 379 may also include context 373. Context 373 may include mailbox 375 and one or more synchronization objects 376. In some embodiments, threads 379 may optionally be in communication with external synchronization objects 381. For example, synchronization objects 376 and/or 381 may include a lock, a semaphore, or an event, by which threads may communicate with one another.

Figure 3D:
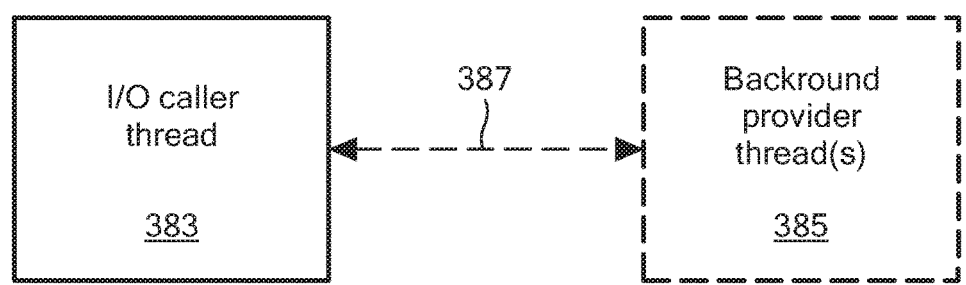
FIG. 3D is a block diagram showing an example relationship between an I/O caller thread and a background provider thread of the storage system of FIG. 1 in accordance with an illustrative embodiment.

Referring to FIG. 3D, described embodiments may employ application programming interfaces (APIs) (e.g., APIs 387) that allow an I/O caller thread 383 to initiate background provider thread(s) 385 and wait for either (a) completion of the background provider thread or (b) time out of the I/O caller thread. In described embodiments, if the I/O caller thread times out, the I/O caller thread detaches the background provider thread and the background provider thread continues (e.g., to completion) as a background (e.g., detached) thread. In described embodiments, if a thread completes, the thread may signal completion via a synchronization object (e.g., 376 of FIG. 3C) such as a lock, a semaphore, or an event. However, in some prior systems, after a completion of a thread, the synchronization objects defined in the thread context may become invalid and cannot be used by other threads. Since, as described herein, either the I/O caller thread or the background provider thread may be the first thread to complete (e.g., the background provider thread may complete first when it executes to completion, while the I/O caller thread may complete first in case of a time out), situations may arise where a thread cannot signal its completion to related threads, since a synchronization object is no longer defined in the related thread context.

Described embodiments provide improved thread synchronization (e.g., communication between threads) to avoid such synchronization issues. For example, described embodiments may employ synchronization objects defined in the context (e.g., contexts 373 of FIG. 3C) of the related threads without employing an external synchronization objects pool. Threads communicate via a "mailbox" or indicator (e.g., mailboxes 375 of FIG. 3C) that is defined in each thread, and thereby provide thread state synchronization without global synchronization objects.

Figure 4:
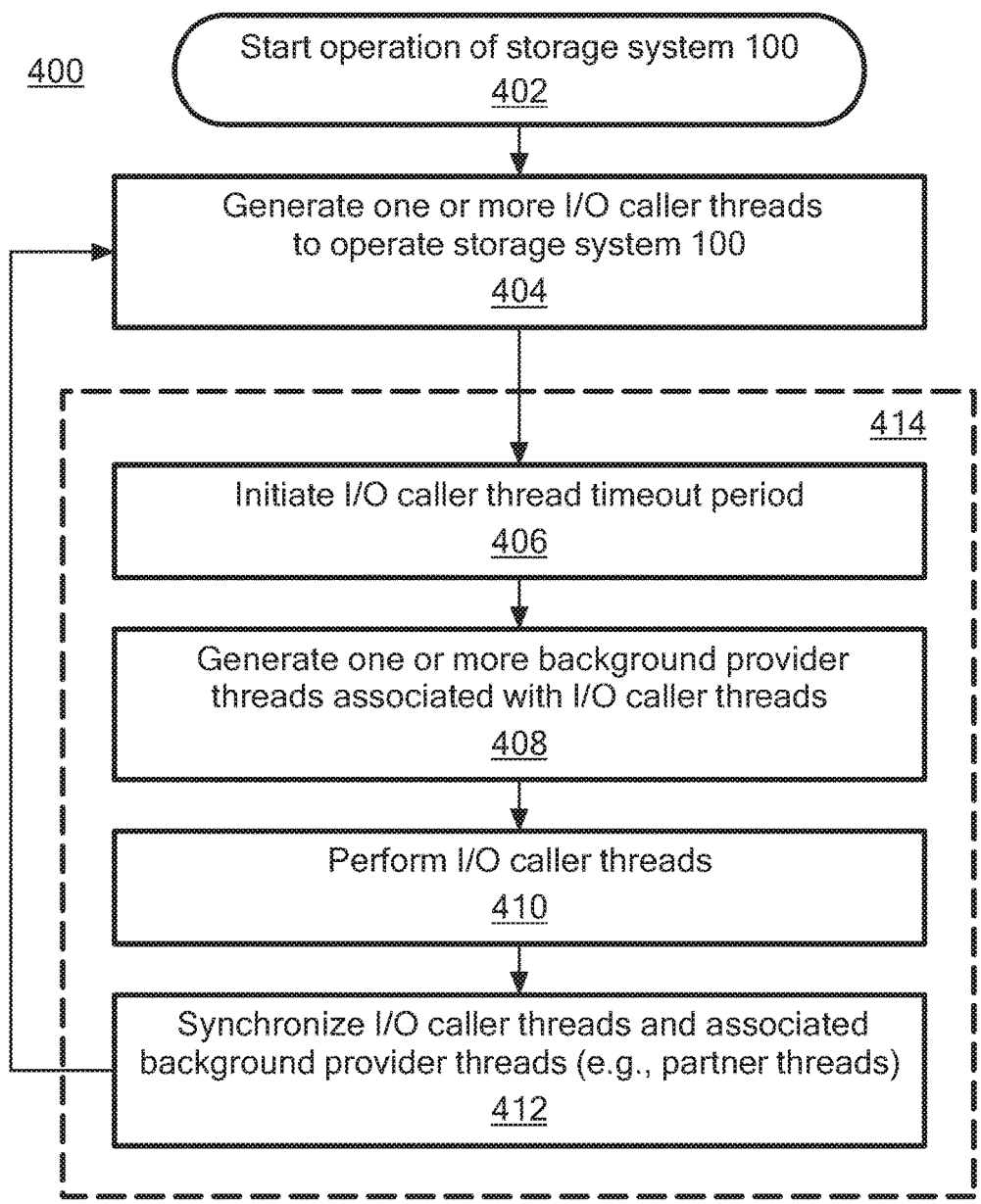
FIG. 4 is a flow diagram of an example of a process to operate the storage system of FIG. 1 in accordance with an illustrative embodiment.

FIG. 4 shows a flow diagram of an illustrative process for operating storage system 100 of FIG. 1, shown as process 400. At block 402, process 400 starts, for example when storage system 100 is powered on. At block 404, storage system 100 may generate one or more I/O caller threads to operate the storage system (e.g., one or more I/O caller threads may be generated to perform I/O requests, such as I/O request 151 of FIG. 1). At block 406, a timeout period of a given I/O caller thread may be initiated. At block 408, a given I/O caller thread may generate one or more background provider threads associated with the given I/O caller thread. At block 410, the I/O caller threads generated at block 404 are performed. At block 412, a given I/O caller thread and its one or more associated background provider threads are synchronized. A given I/O caller thread and its associated background provider thread(s) may be referred to collectively as "partner threads".

Process 400 may continue to operate until storage system 100 is powered off. As indicated by dashed line 414, blocks 406, 408, 410 and 412 may generally be performed for each I/O caller thread of storage system 100.

Figure 5:
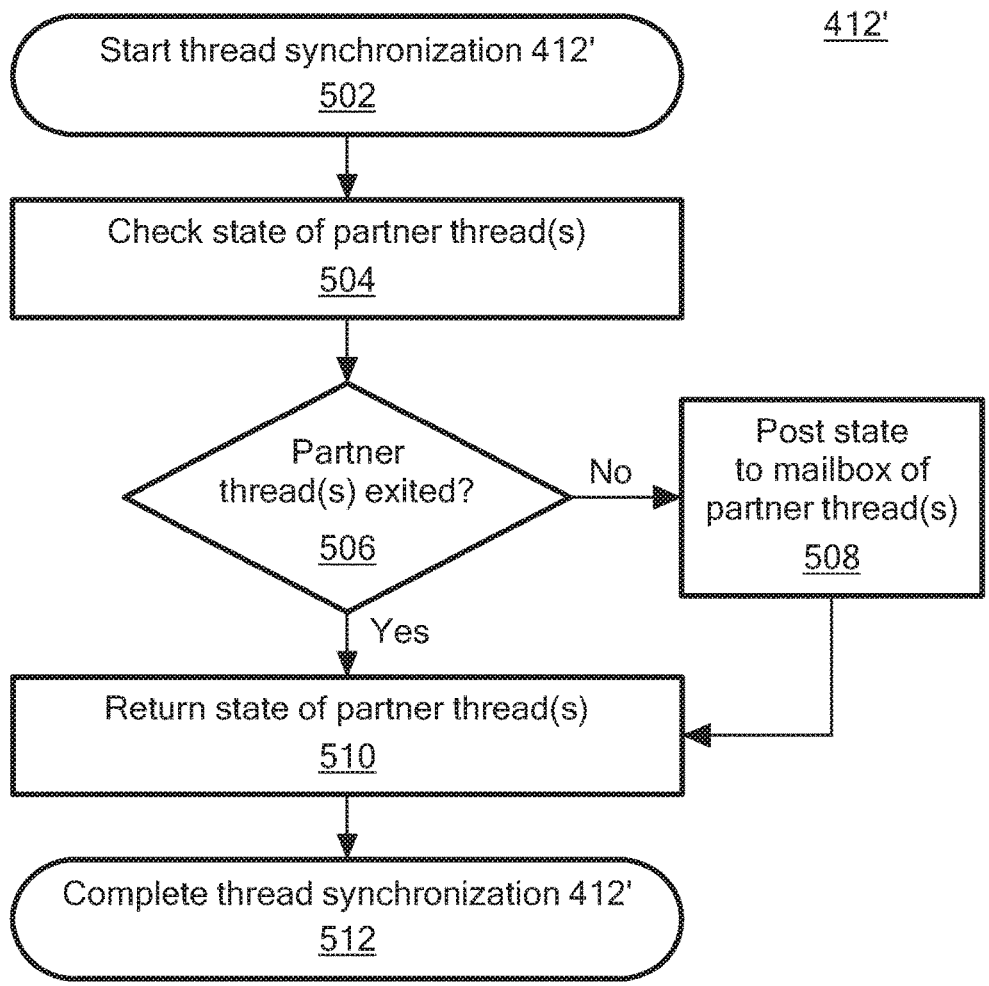
FIG. 5 is a flow diagram of an example of a process to synchronize threads of the storage system of FIG. 1 in accordance with an illustrative embodiment.

FIG. 5 shows additional detail of block 412 of FIG. 4 for synchronizing partner threads, shown as process 412'. As shown in FIG. 5, process 412' may start at block 502. At block 504, a given thread (e.g., either an I/O caller thread or a background provider thread) may check a state of its partner thread(s). At block 506, if the state of the partner thread determined at block 504 indicates that the partner thread has exited (e.g., the thread state is TH_STATE_EXITED), then at block 510, the state of the partner thread is returned to the thread being synchronized (e.g., the thread for which process 412' is being performed, or the thread state is, for example, TH_STATE_INIT, or TH_STATE_WORKING), and the threads are considered synchronized (e.g., since the partner thread has exited). Process 412' continues to block 512.

If, at block 506, the state of the partner thread determined at block 504 indicates that the partner thread has not exited (e.g., the thread is still active), then at block 508, the thread that is being synchronized (e.g., the thread for which process 412' is being performed) posts its state to a mailbox in a context associated with the partner thread(s). Updating the mailbox is a safe operation because the partner thread has not exited, and, thus, its associated mailbox is valid. At block 510, the thread that is being synchronized (e.g., the thread for which process 412' is being performed) returns the state of its partner thread(s). Process 412' completes at block 512.

In some described embodiments, process 412' of FIG. 5 may generally be performed by I/O caller threads to check the states of, and synchronize with, one or more background provider threads. Thus, in some embodiments, process 412' may be performed multiple times to synchronize each set of partner threads (e.g., each set of an I/O caller thread and one or more background provider threads).

For example, if there are two threads, Thread1 and Thread2, that should be synchronized, described embodiments provide communications between the threads without using an external synchronization object. Described embodiments may define a mailbox field (e.g., th_state_mailbox, shown as mailbox 373 in FIG. 3C) in the context for each of Thread1 and Thread2. Thread1 may post its current state to the mailbox field in the context of Thread2 (e.g., th_state_mailbox2) and Thread2 may post its current state to the mailbox field in the context of Thread1 (e.g., th_state_mailbox1). Thus, the mailbox field in the context of Thread2 (e.g., th_state_mailbox2) contains an indicator of the state of Thread1, and the mailbox field in the context of Thread1 (e.g., th_state_mailbox1) contains an indicator of the state of Thread2.

In described embodiments, a given thread may post its state (e.g., make the state visible to partner thread(s)) to a mailbox in the context of partner thread(s) by using an associated synchronization primitive. For example, some embodiments may employ a synchronization primitive th_check_another_exited_andpost_my_state(state), which may atomically (e.g., with guaranteed isolation from other threads) synchronize states between partner threads. For example, as shown in FIG. 5, a given I/O caller thread may employ an illustrative synchronization primitive to determine a state of a partner thread (e.g., an associated background provider thread) by checking the value of the mailbox field located in its own context (e.g., Thread1 may check the status of Thread2 by checking the value of th_state_mailbox1). Such an operation is safe, even if the partner thread has exited, since the mailbox field is located in the context associated with the thread that is checking the status of the partner thread.

To provide atomic access (e.g., with guaranteed isolation from other threads) of the synchronization primitive, some embodiments may employ a spinlock. As understood in the art, a spinlock causes a thread trying to acquire a lock on a resource (e.g., trying to access a function protected by the spinlock) to wait in a loop (e.g., spin) while repeatedly checking if the lock is available. In an illustrative embodiment, the spinlock may be implemented as a single spinlock defined statically for the entire thread synchronization mechanism (e.g., for all threads of storage system 100). In other embodiments, for example embodiments where partner threads (e.g., Thread1 and Thread2) are executed inside the same processor in a non-preemptive (cooperative) environment, a spinlock may not be required to provide atomic access.

Thus, described embodiments provide safe communication between partner threads that is independent of the order in which threads complete (e.g., exit). Further, described embodiments do not require external synchronization objects.

Described embodiments may further provide a manner for detaching an expired thread. For example, an I/O caller thread may employ the thread synchronization process shown in FIG. 5 to determine whether a given background provider thread has expired (e.g., timed out). Described embodiments may employ an API to detach an expired thread. For example, an API (e.g., 387 of FIG. 3D) X_TH_EXEC_AND_DETACH_IF_EXPIRED (void*param_block) may be employed by an illustrative embodiment. Such an API may return a success indicator if the background provider thread has completed, and may return an expired indicator if the background provider thread has timed out before it completed.

Figure 6:
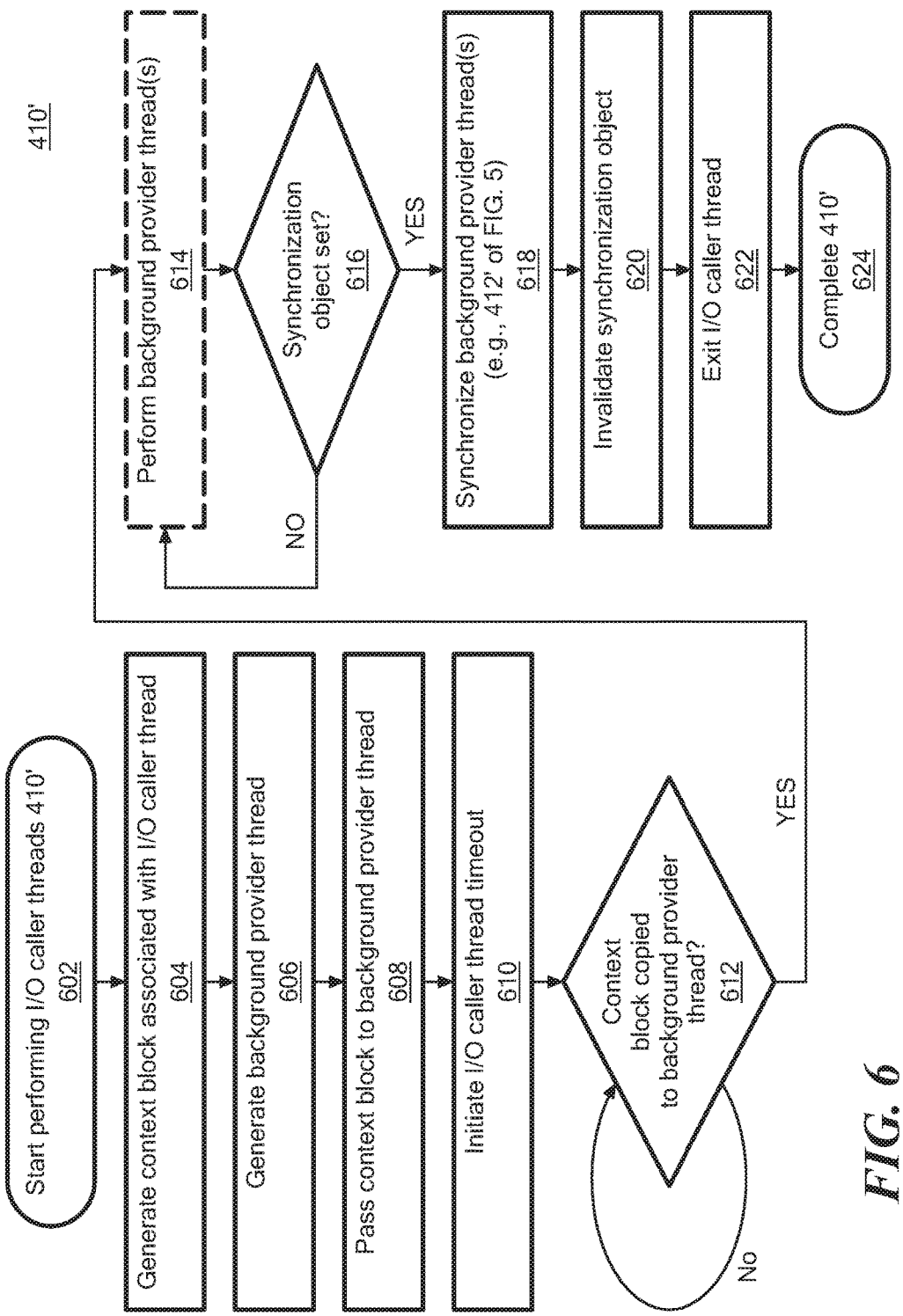
FIG. 6 is a flow diagram of an example of a process to perform I/O caller threads of the storage system of FIG. 1 in accordance with an illustrative embodiment.

FIG. 6 shows additional detail of block 410 of FIG. 4 for performing threads, shown as process 410', which some embodiments may employ to detach an expired thread. As shown in FIG. 6, process 410' may start at block 602. At block 604, a context block (ctx_block) may be generated for an associated I/O caller thread, for example in a function stack associated with the I/O caller thread. The context block may contain a copy of any input (param_block) associated with the I/O caller thread, and one or more pointers or references to a synchronization object (sync_obj) associated with the I/O caller thread. At block 606, an associated background provider thread may be generated, and at block 608, the context block for the associated I/O caller thread may be passed to the associated background provider thread. At block 610, the timeout period associated with the I/O caller thread is initiated. At block 612, the background provider thread copies the context block to its own context (during which the background provider thread has a state of TH_STATE_INIT). When the background provider thread completes copying the context block, the background provider thread updates its state to TH_STATE_WORKING (e.g., by updating the mailbox of the I/O caller thread), and process 410' continues to block 614.

At block 614, the background provider thread may be performed (e.g., by processor 105 of FIG. 1). Although shown as part of process 410', I/O caller threads and background provider threads may generally be performed independently of one another, as indicated by the dashed line of block 614. For example, an I/O caller thread may "wait" at block 616 for the synchronization object to be set (e.g., set by a given background provider thread indicating that the background provider thread has completed, or set to indicate that the I/O caller thread has timed out). In such a way, the I/O caller thread may operate until the synchronization object is set indicating either a time out, or that an associated background provider thread has completed. If, at block 616, the synchronization object is set, then at block 618, the I/O caller thread may synchronize with the background provider thread at block 618 by performing process 412' of FIG. 5. As described in regard to FIG. 5, if the background provider thread has completed (e.g., has posted a state of TH_STATE_EXITED), then the synchronization object in the context block may be invalidated (or destroyed) at block 620 since the background provider thread is complete and the synchronization object may no longer be valid or usable. At block 622, the I/O caller thread may be exited. Process 410' completes at block 624. As described herein, the synchronization object may be a semaphore, lock, or event that allows a background provider thread to wake an associated I/O caller thread.

Figure 7:
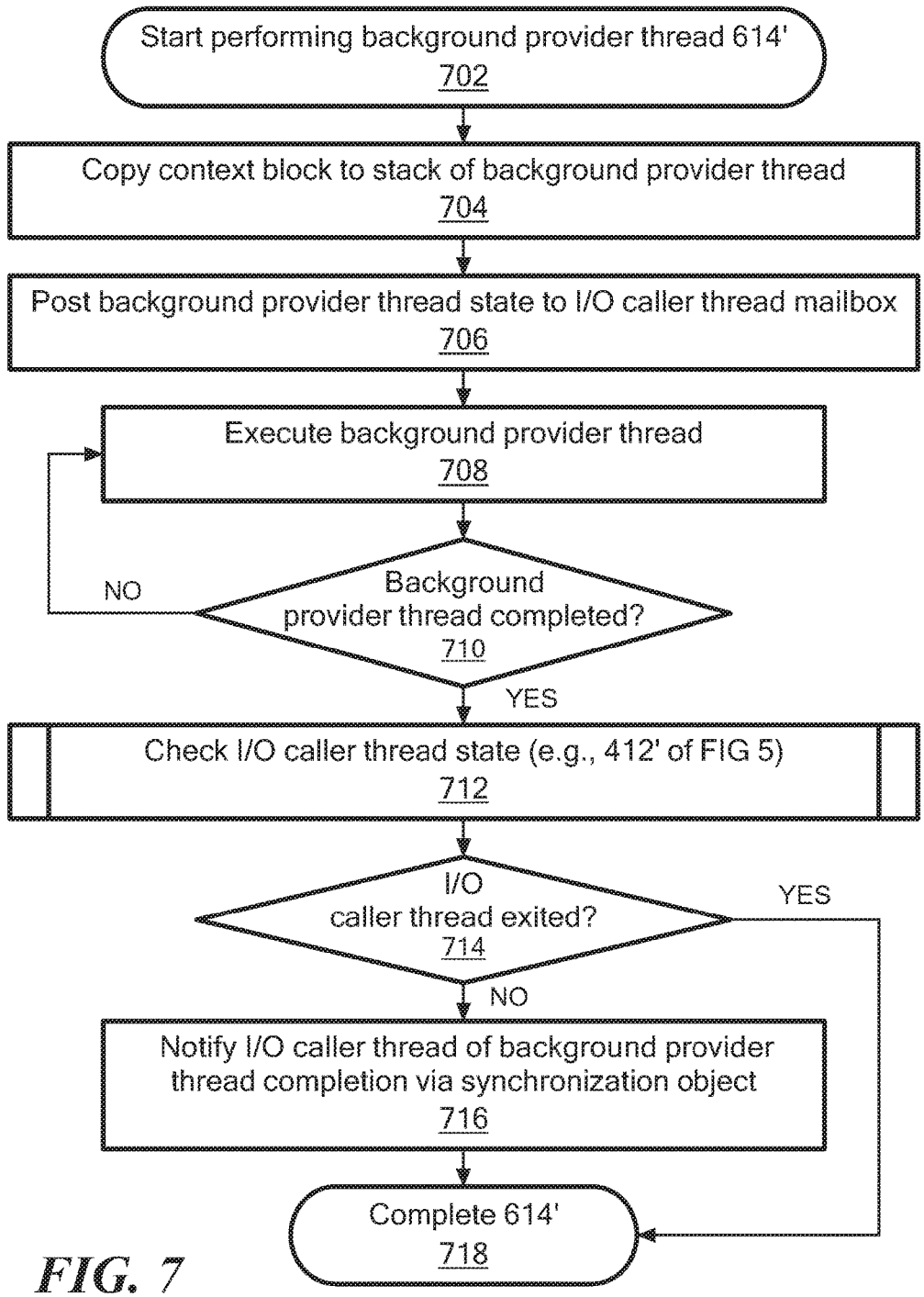
FIG. 7 is a flow diagram of an example of a process to perform a background provider thread of the storage system of FIG. 1 in accordance with an illustrative embodiment.

FIG. 7 shows additional detail of block 614 for performing a flow of the background provider thread, shown as process 614'. As shown in FIG. 7, at block 702, process 614' may start. At block 704, the context block copied from the I/O caller thread is copied to the stack associated with the background provider thread. At block 706, the background provider thread posts its state (e.g., TH_STATE_WORKING) to the mailbox of the I/O caller thread (e.g., as described in regard to FIG. 5). At block 708, the background provider thread is performed. At block 710, if the background provider thread completes, then at block 712, the background provider thread checks the state of the I/O caller thread (e.g., by checking its own mailbox). At block 714, if the I/O caller thread exited, then the background provider thread completes at block 718. If, at block 714, the I/O caller thread has not exited (e.g., is still operating, such that its state is not TH_STATE_EXITED), then at block 716, the background provider thread notifies the I/O caller thread that the background provider thread has completed, for example, via the associated synchronization object.

Figure 8:
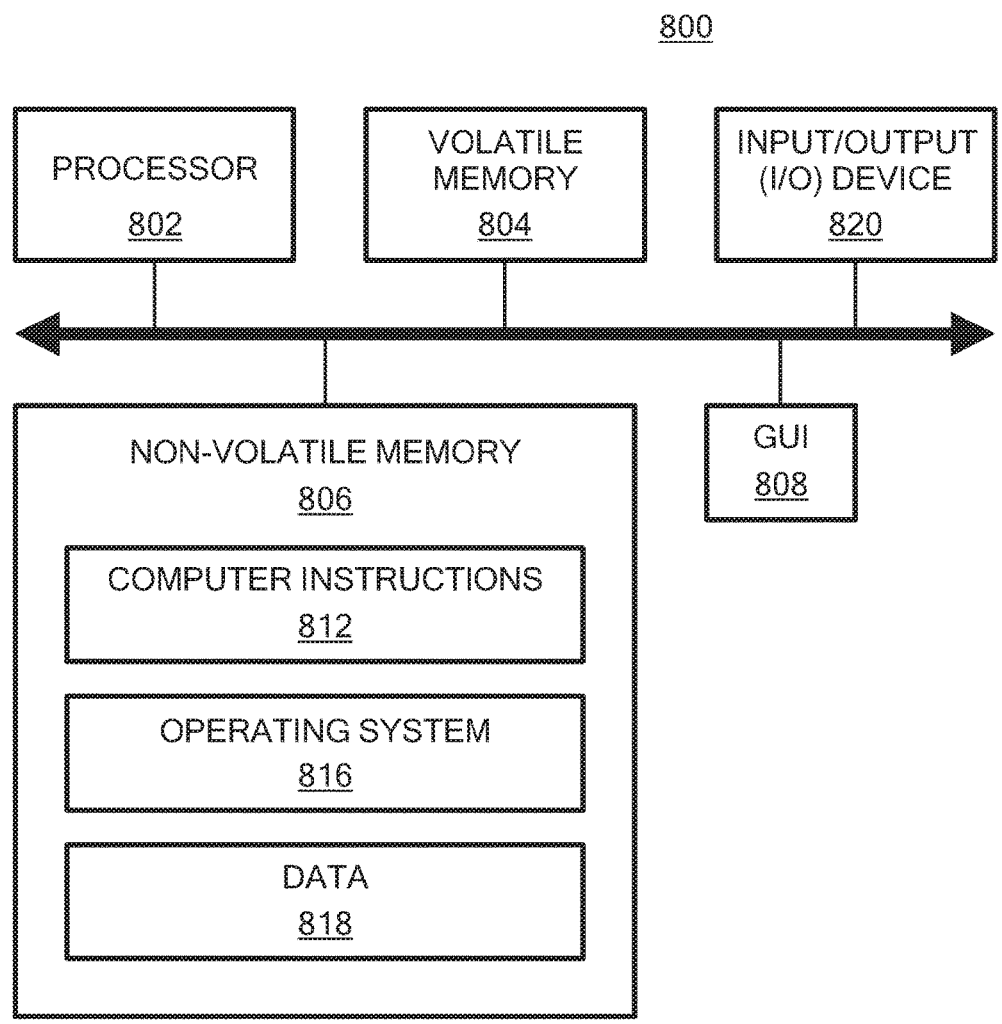
FIG. 8 is a block diagram of an example of a hardware device that may perform at least a portion of the processes in FIGS. 4-7.

Referring to FIG. 8, in some embodiments, source site 102 and/or target site 112 may be implemented as one or more computers. Computer 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes shown in FIGS. 4-7. Program code may be applied to data entered using an input device of GUI 808 or received from I/O device 820.

Processes 400, 410', 412', and 614' (FIGS. 4-7) are not limited to use with the hardware and software of FIG. 8 and may find applicability in any computing or processing environment and with any type of machine or set of machines that may be capable of running a computer program. Processes 400, 410', 412', and 614' (FIGS. 4-7) may be implemented in hardware, software, or a combination of the two.

The processes described herein are not limited to the specific embodiments described. For example, processes 400, 410', 412', and 614' are not limited to the specific processing order shown in FIGS. 4-7. Rather, any of the blocks of processes 400, 410', 412', and 614' may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

I claim:
1. A method comprising:
   generating one or more input/output (I/O) caller threads to operate a storage system;

generating, for each of the one or more I/O caller threads, one or more background provider threads associated with a given one of the I/O caller threads; and synchronizing each of the one or more background provider threads with the associated I/O caller thread according to respective states of the I/O caller threads and the one or more background provider threads, the respective states indicated by at least one of associated context data and an associated synchronization object, wherein synchronizing the one or more background provider threads with the associated I/O caller thread comprises:

checking, by each background provider thread, a state of the associated I/O caller thread, and based upon the state of the associated I/O caller thread, posting, by each background provider thread, a state indicator to a mailbox field in a context of the associated I/O caller thread; and checking, by each I/O caller thread, a state of the one or more associated background provider threads, and based upon the state of the one or more associated background provider threads, posting, by the associated I/O caller thread, a state indicator to a mailbox field in a context of the one or more background provider threads associated with the I/O caller thread, and wherein checking, by each background provider thread, a state of the associated I/O caller thread further comprises determining whether the associated I/O caller thread has exited and, if so, exiting the background provider thread without posting the state indicator to the mailbox field in the context of the associated I/O caller thread.

2. The method of claim 1, wherein checking, by each I/O caller thread, a state of the one or more associated background provider threads further comprises determining whether each of the associated background provider threads have exited and, if so, not posting the state indicator to the mailbox field in the context of the associated background provider threads.

3. The method of claim 1, wherein each of the one or more I/O caller threads has an associated timeout period, the method further comprising:

initializing the timeout period of each of the I/O caller threads;

generating a context block associated with each of the one or more I/O caller threads; and copying the context block from each of the one or more I/O caller threads to each of the one or more background provider threads associated with the I/O caller thread, wherein the context block comprises a synchronization object to communicate between the I/O caller thread and the one or more background provider threads associated with the I/O caller thread.

4. The method of claim 3, further comprising:

performing the one or more background provider threads; and exiting the background provider thread without posting the state indicator of the one or more background provider threads to the mailbox field in the context of the associated I/O caller thread if the timeout period of the I/O caller thread associated with the one or more background provider threads has expired.

5. The method of claim 4, further comprising, if the timeout period of the I/O caller thread associated with the one or more background provider threads has not expired:

posting the state indicator of the one or more background provider threads to the mailbox field in the context of the associated I/O caller thread;

deleting the synchronization object from the context block; and exiting the background provider thread.

6. The method of claim 5, wherein exiting the background provider thread comprises detaching the background provider thread and performing the background provider thread as a background process of the storage system.

7. The method of claim 3, further comprising:

determining, by the one or more background provider threads, a state of the I/O caller thread based upon the mailbox field in the context of each of the one or more background provider threads; and based upon the state of the I/O caller thread, notifying, via the synchronization object, the I/O caller thread when each of the one or more background provider threads complete.

8. A system comprising:

a processor; and memory storing computer program code that when executed on the processor causes the processor to operate a storage system, the storage system operable to perform the operations of:

generating one or more input/output (I/O) caller threads to operate a storage system;

generating, for each of the one or more I/O caller threads, one or more background provider threads associated with a given one of the I/O caller threads; and synchronizing each of the one or more background provider threads with the associated I/O caller thread according to respective states of the I/O caller threads and the one or more background provider threads, the respective states indicated by at least one of associated context data and an associated synchronization object, wherein synchronizing the one or more background provider threads with the associated I/O caller thread comprises:

checking, by each background provider thread, a state of the associated I/O caller thread, and based upon the state of the associated I/O caller thread, posting, by each background provider thread, a state indicator to a mailbox field in a context of the associated I/O caller thread; and checking, by each I/O caller thread, a state of the one or more associated background provider threads, and based upon the state of the one or more associated background provider threads, posting, by the associated I/O caller thread, a state indicator to a mailbox field in a context of the one or more background provider threads associated with the I/O caller thread, and wherein checking, by each background provider thread, a state of the associated I/O caller thread further comprises determining whether the associated I/O caller thread has exited and, if so, exiting the background provider thread without posting the state indicator to the mailbox field in the context of the associated I/O caller thread.

9. The system of claim 8, wherein the storage system is further operable to perform the operation of checking, by each I/O caller thread, a state of the one or more associated background provider threads further comprises determining whether each of the associated background provider threads have exited and, if so, not posting the state indicator to the mailbox field in the context of the associated background provider threads.

10. The system of claim 8, wherein each of the one or more I/O caller threads has an associated timeout period, and wherein the storage system is further operable to perform the operations of:
    initializing the timeout period of each of the I/O caller threads;
    generating a context block associated with each of the one or more I/O caller threads; and
    copying the context block from each of the one or more I/O caller threads to each of the one or more background provider threads associated with the I/O caller thread, wherein the context block comprises a synchronization object to communicate between the I/O caller thread and the one or more background provider threads associated with the I/O caller thread;
    performing the one or more background provider threads; and
    exiting the background provider thread without posting the state indicator of the one or more background provider threads to the mailbox field in the context of the associated I/O caller thread if the timeout period of the I/O caller thread associated with the one or more background provider threads has expired.

11. The system of claim 10, wherein if the timeout period of the I/O caller thread associated with the one or more background provider threads has not expired, the storage system is further operable to perform the operations of:
    posting the state indicator of the one or more background provider threads to the mailbox field in the context of the associated I/O caller thread;
    deleting the synchronization object from the context block; and
    exiting the background provider thread.

12. The system of claim 11, wherein the storage system is further operable to perform the operations of:
    determining, by the one or more background provider threads, a state of the I/O caller thread based upon the mailbox field in the context of each of the one or more background provider threads; and
    based upon the state of the I/O caller thread, notifying, via the synchronization object, the I/O caller thread when each of the one or more background provider threads complete.

13. A computer program product including a non-transitory computer readable storage medium having computer program code encoded thereon that when executed on a processor of a computer causes the computer to operate a storage system, the computer program product comprising:
    computer program code for generating one or more input/output (I/O) caller threads to operate a storage system;
    computer program code for generating, for each of the one or more I/O caller threads, one or more background provider threads associated with a given one of the I/O caller threads; and
    computer program code for synchronizing each of the one or more background provider threads with the associated I/O caller thread according to respective states of the I/O caller threads and the one or more background provider threads, the respective states indicated by at least one of associated context data and an associated synchronization object,
    wherein synchronizing the one or more background provider threads with the associated I/O caller thread comprises:
        checking, by each background provider thread, a state of the associated I/O caller thread, and based upon the state of the associated I/O caller thread, posting, by each background provider thread, a state indicator to a mailbox field in a context of the associated I/O caller thread; and
        checking, by each I/O caller thread, a state of the one or more associated background provider threads, and based upon the state of the one or more associated background provider threads, posting, by the associated I/O caller thread, a state indicator to a mailbox field in a context of the one or more background provider threads associated with the I/O caller thread, and
    wherein checking, by each background provider thread, a state of the associated I/O caller thread further comprises determining whether the associated I/O caller thread has exited and, if so, exiting the background provider thread without posting the state indicator to the mailbox field in the context of the associated I/O caller thread.

14. The computer program product of claim 13, wherein the computer program product further comprises:
    computer program code for initializing a timeout period of each of the I/O caller threads;
    computer program code for generating a context block associated with each of the one or more I/O caller threads;
    computer program code for copying the context block from each of the one or more I/O caller threads to each of the one or more background provider threads associated with the I/O caller thread, wherein the context block comprises a synchronization object to communicate between the I/O caller thread and the one or more background provider threads associated with the I/O caller thread;
    computer program code for performing the one or more background provider threads;
    if the timeout period of the I/O caller thread associated with the one or more background provider threads has not expired, the computer program product further comprises:
        computer program code for posting the state indicator of the one or more background provider threads to the mailbox field in the context of the associated I/O caller thread;
        computer program code for deleting the synchronization object from the context block; and
        computer program code for exiting the background provider thread.

15. The computer program product of claim 14, wherein the computer program product further comprises:
    computer program code for determining, by the one or more background provider threads, a state of the I/O caller thread based upon the mailbox field in the context of each of the one or more background provider threads; and
    computer program code for notifying, based upon the state of the I/O caller thread and via the synchronization object, the I/O caller thread when each of the one or more background provider threads complete, wherein the synchronization object comprises at least one of: a lock, a semaphore, and an event.

* * * * *